United States Patent [19]
Masaki

[11] Patent Number: 4,513,400
[45] Date of Patent: Apr. 23, 1985

[54] CIRCUIT FOR READING OUT ADDRESS DATA APPLIED TO A MEMORY IN A ONE-CHIP MICROCOMPUTER

[75] Inventor: Satoru Masaki, Kawasaki, Japan

[73] Assignee: Fujitsu Limited, Kawasaki, Japan

[21] Appl. No.: 390,875

[22] Filed: Jun. 22, 1982

[30] Foreign Application Priority Data

Jun. 25, 1981 [JP] Japan .................. 56-97396

[51] Int. Cl.³ .................. G06F 1/00; G11C 19/28
[52] U.S. Cl. .................. 365/230; 365/233; 365/236; 365/240
[58] Field of Search .......... 365/230, 236, 239, 240, 365/233, 201, 94

[56] References Cited

U.S. PATENT DOCUMENTS 3,708,690 1/1973 Paivinen .................. 365/239
3,939,452 2/1976 Faggian .................. 364/200

FOREIGN PATENT DOCUMENTS 117640 12/1979 Japan .................. 365/230
15271 6/1980 Japan .................. 365/230
1542135 3/1979 United Kingdom .
202341A 12/1979 United Kingdom .

OTHER PUBLICATIONS

IBM Technical Disclosure Bulletin, "Serializer", by M. Cukier et al., vol. 17, No. 9, Feb. 1975, pp. 2654-2655.

Primary Examiner—Stuart N. Hecker
Assistant Examiner—Glenn Gossage
Attorney, Agent, or Firm—Staas & Halsey

[57] ABSTRACT

A circuit for reading out address data applied to a memory in a one-chip microcomputer which does not have any address terminals but has input/output terminals. The circuit comprises a program counter for specifying reading out addresses of the memory. Transfer gates and a shift register are also provided. The transfer gates transfer the contents of the program counter to the shift register when an address output enable signal is applied to the transfer gates. The contents stored in the shift register are read out to an address output terminal connected to the shift register.

7 Claims, 4 Drawing Figures

CIRCUIT FOR READING OUT ADDRESS DATA APPLIED TO A MEMORY IN A ONE-CHIP MICROCOMPUTER

BACKGROUND OF THE INVENTION (1) Field of the Invention

This invention relates to a circuit for reading out address data applied to a memory in a one-chip microcomputer, more particularly to a circuit for reading out the readout address data of a memory in a one-chip microcomputer which does not have any address terminals but has input/output terminals to the outside.

(2) Description of the Prior Art

Generally, a one-chip microcomputer comprises a read-only memory (ROM) for storing a program and a program counter for executing the program by designating the addresses in the ROM. In mass-produced microcomputers, such as four-bit or eight-bit microcomputers (except evaluation chips for evaluating mass-produced chips), the ROM is a mask type ROM and the stored program is fixed in the mask ROM. Users generally do not have to rewrite or debug the stored program. Therefore, one-chip microcomputers do not have address output terminals for outputting the read-out address of the ROM, i.e., the contents of the program counter (see, for example, TSM 1000 Series MOS/LSI ONE-CHIP MICROCOMPUTERS SOFTWARE USER'S GUIDE, TEXAS INSTRUMENTS Pages 1-1, 1-8 and 105). However, during the manufacture of one-chip microcomputers or during the shipment of manufactured microcomputers, it is often necessary to investigate the contents of the program counter for debugging, functional tests, mounting tests, or analysis of bad chips.

To enable investigation of the contents of the program counter from the outside of a one-chip microcomputer, terminals may be provided for outputting the addresses. However, the same number of terminals would be required for outputting addresses as the number of outputs of the program counter. When the memory capacity of a ROM is 4096 bytes, the program counter would have 12 outputs, as is known from the equation $4096 = 2^{12}$.

Users of mass-produced microcomputers do not need terminals for outputting addresses. Further, provision of terminals for outputting addresses would increase the number of input/output terminals of one-chip microcomputers. Therefore, it is not preferable to provide output terminals used only for outputting addresses.

An address output function could be provided to the original input/output terminals of one-chip microcomputers, but in this case, the wiring pattern would become so complex that the chip size would be increased.

Conventionally, the contents of the program counter of a one-chip microcomputer (except evaluation chips) have been investigated by using signals obtained when the program counter overflows. For example, when the program counter outputs 12 bits for specifying an address from 0 address to 4095 address of the ROM, it overflows after outputting data 'FFF' (hexadecimal expression). Accordingly, when a jump instruction is provided, so that an address of, for example, '555' (hexadecimal expression) is specified by the program counter, and it is necessary to check whether the program counter correctly specifies the jumped address, it is necessary to wait until the program counter overflows, that is, it is necessary to wait for AAA steps (hexadecimal expression) because $FFF - 555 = AAA$. If the program counter correctly specified the jumped address, it provides an overflow signal after counting AAA from the jump instruction.

In this conventional method, therefore, while the contents of the program counter could be checked by counting the number of steps from the desired address to the overflow address, the necessity of waiting until the program counter overflows makes the time required to make this check long.

SUMMARY OF THE INVENTION

In view of the foregoing, it is a principal object of the present invention to decrease the read-out time for reading the contents of a program counter included in a one-chip microcomputer which does not have terminals used only for outputting the contents of the program counter, and without adding any input/output terminals.

BRIEF DESCRIPTION OF THE DRAWINGS

The invention will be better understood from the following more detailed description taken in conjunction with the accompanying drawings, in which.

DESCRIPTION OF THE PREFERRED EMBODIMENT

An embodiment of the present invention will now be described with reference to the drawings.

Figure 1:
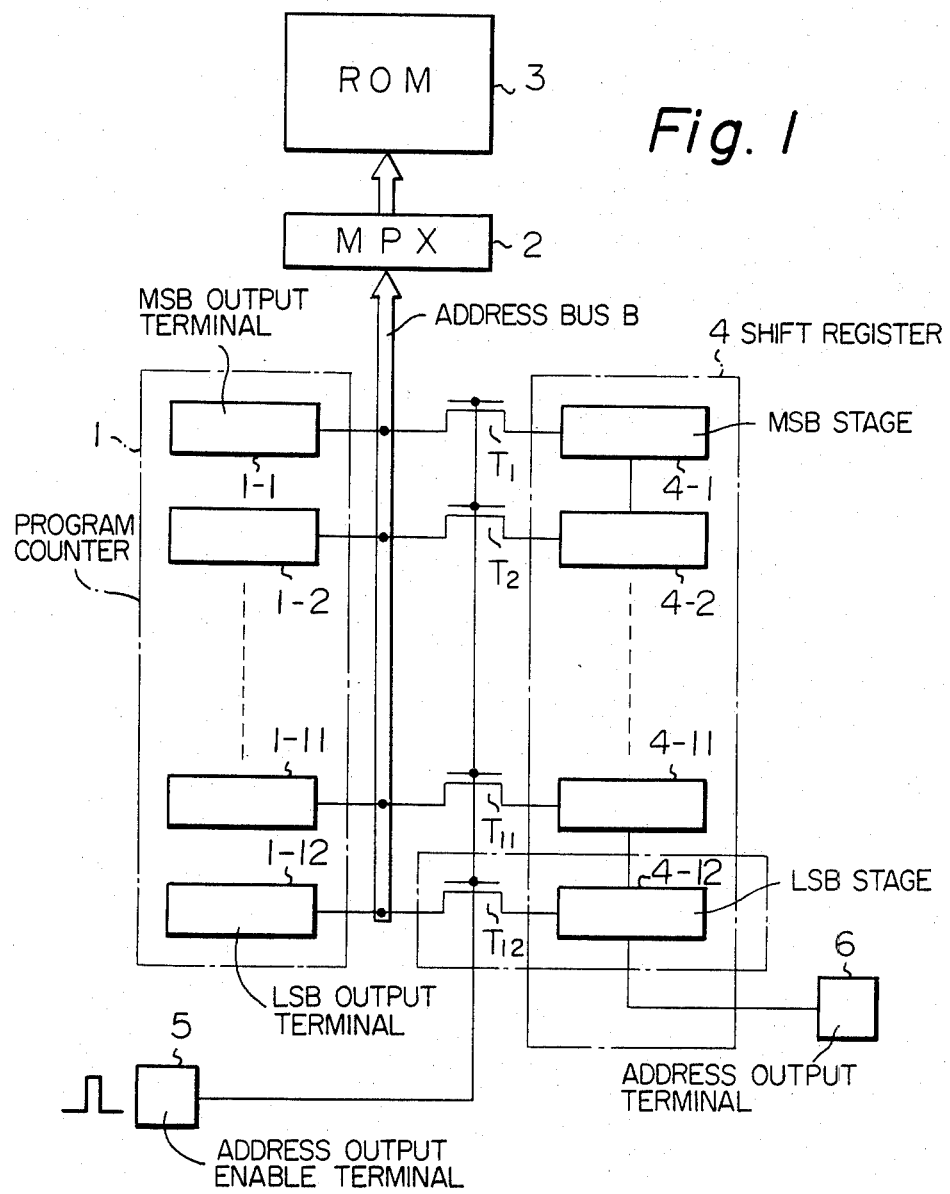
FIG. 1 is a block circuit diagram of a circuit for reading out address data from a memory in a one-chip microcomputer, according to an embodiment of the present invention.

FIG. 1 is a block circuit diagram of a circuit for reading out address data from a memory in a one-chip microcomputer. Referring to FIG. 1, only a part of the one-chip microcomputer is illustrated for purposes of highlighting the part pertaining to the present invention. A program counter 1 is connected through an address bus B and a multiplexer 2 to a ROM 3. Program counter 1, in this embodiment, has 12 output terminals 1-1 through 1-12. Output terminals 1-1 outputs the most significant bit, while output terminal 1-12 represents the least significant bit. Accordingly, program counter 1 can specify one of $2^{12} = 4096$ addresses in ROM 3. Output terminals 1-1, 1-2, ..., and 1-12 are connected to drains (or sources) of metal oxide semiconductor (MOS) transistors $T_1, T_2, \ldots,$ and $T_{12}$, respectively. The sources (or drains) of transistors $T_1, T_2, \ldots,$ and $T_{12}$ on the other hand, are connected to a shift register 4. Shift register 4 comprises 12 stages 4-1 through 4-12. Stage 4-1 represents the most significant bit stage, while stage 4-12 represents the least significant bit stage. Thus, there is a one-to-one correspondence between the output terminals 1-1 through 1-12 and the 12 stages 4-1 through 4-12. The gates of transistors $T_1, T_2, \ldots,$ and $T_{12}$ are commonly connected to an address output enable terminal 5 to which an enable signal is applied when the contents of program counter 1 are to be read out. Thus, transistors $T_1, T_2, \ldots,$ and $T_{12}$ act as transfer gates for transferring data from program counter 1 to shift register 4. Each stage of the shift register 4 is sequentially connected to the next lower bit stage. The least significant bit stage 4-12 is connected to an address output terminal 6. Address output enable terminal 5 and address output terminal 6 can be realized by utilizing common, existing input/output terminals which a conventional microcomputer has. Therefore, no additional terminal is required for address output enable terminal 5 and address output terminal 6. During readout of the contents of program counter 1, the original function of terminals 5 and 6, that is, the function as input/output terminals, is not necessary. Therefore, no problem is caused by utilizing these input/output terminals as address output enable terminal 5 and address output terminal 6.

When the contents of program counter 1 are to be read out, one pulse is applied to address output enable terminal 5 to turn on all of transistors $T_1$, $T_2$, ..., and $T_{12}$. Then, the data stored in program counter 1 is transferred through transistors $T_1$, $T_2$, ..., and $T_{12}$ to the corresponding stages of shift register 4. After the pulse has been applied to address output enable terminal 5, all of transistors $T_1$, $T_2$, ..., and $T_{12}$ are turned off again. Thus, program counter 1 is electrically separated from shift register 4. As a result, the contents of program counter 1, at the time the pulse is applied to address output enable terminal 5, are stored in shift register 4, while, program counter 1 continues to operate to change its contents. As described in detail in the following, a clock signal is applied to shift register 4 to read out the data stored therein. Thus, the contents of program counter 1 at the time when the pulse is applied to terminal 5 are outputted from address output terminal 6 in sequence from the least significant bit to the most significant bit.

Figure 2:
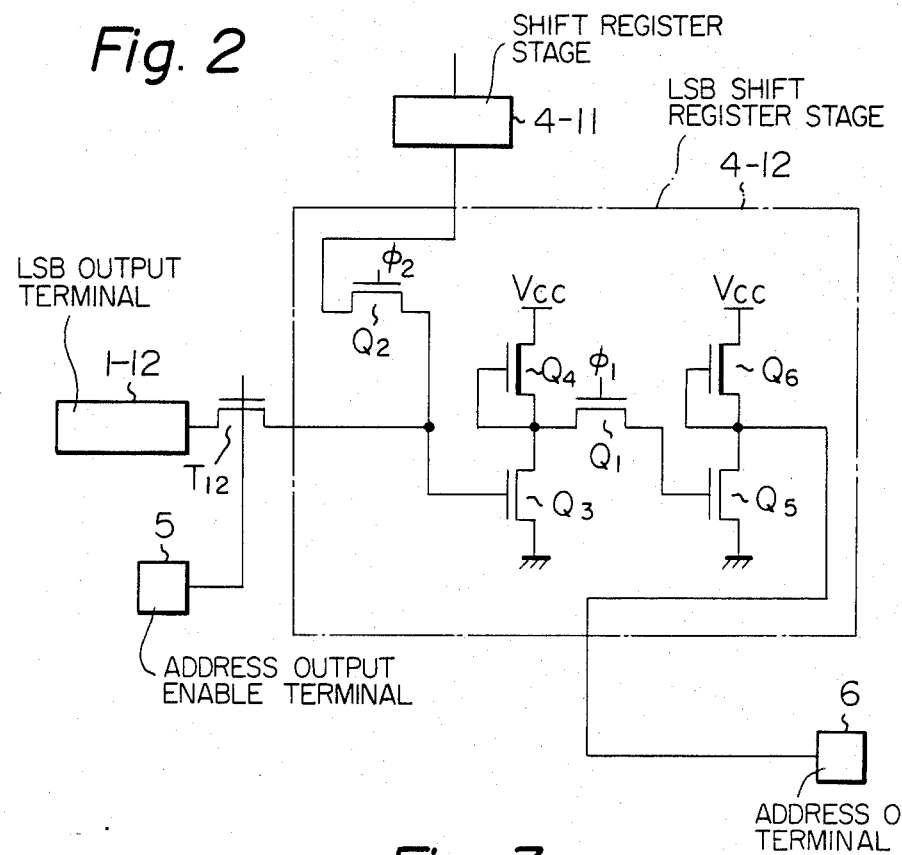
FIG. 2 is a detailed circuit diagram of part of the circuit of FIG. 1.

FIG. 2 is a circuit diagram of the least significant bit stage 4-12 of shift register 4. Referring to FIG. 2, $Q_1$ and $Q_2$ are data transferring transistors; $Q_3$ and $Q_5$ are enhancement-type MOS transistors for storing data; and $Q_4$ and $Q_6$ are depletion-type MOS transistors functioning as load resistances. The drain (or source) of transistor $Q_2$ is connected to the output of preceding stage 4-11 of shift register 4. The source (or the drain) of transistor $Q_2$ and the source (or the drain) of transfer-gate transistor $T_{12}$ are commonly connected to the gate of transistor $Q_3$. The drain (or the source) of transistor $Q_4$ is connected to power supply $V_{CC}$. The gate and the source (or the drain) of transistor $Q_4$ are commonly connected to the drain (or the source) of transistor $Q_3$ and to the gate of transistor $Q_5$. The source (or the drain) of transistor $Q_3$ is grounded. Thus, transistors $Q_3$ and $Q_4$ constitute an inverter. Transistors $Q_5$ and $Q_6$ are wired similarly to the wiring of transistor $Q_3$ and $Q_4$, to form another inverter. The output of the inverter, that is, the common connecting point of the gate and the source (or the drain) of transistor $Q_6$ and drain (or source) of transistor $Q_5$ is connected to address output terminal 6. Clock signals $\phi_1$ and $\phi_2$ are applied to the gates of transistors $Q_1$ and $Q_2$, respectively.

Figure 3:
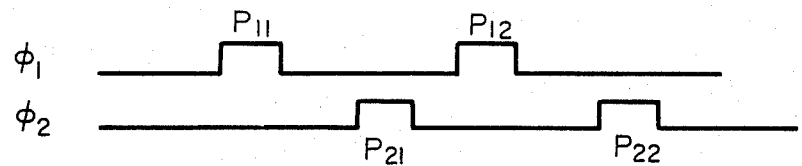
FIG. 3 is a waveform diagram of clock signals applied to the circuit of FIG. 2.
Figure 4:
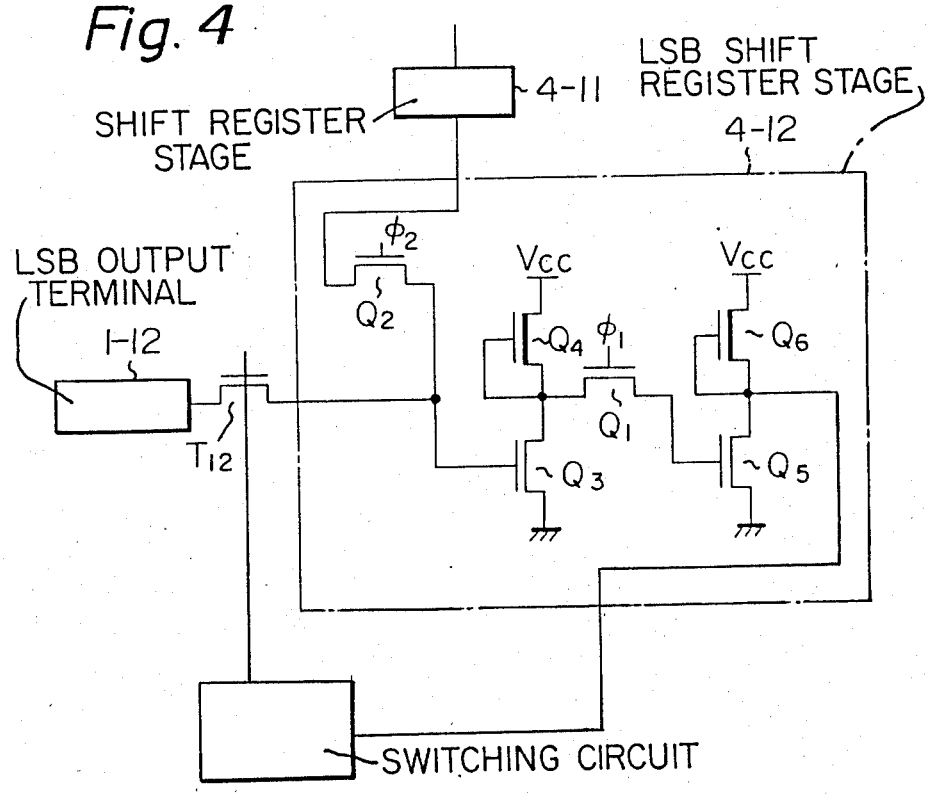
FIG. 4 is a circuit diagram according to another embodiment of the present invention.

FIG. 3 is a waveform diagram of clock signals $\phi_1$ and $\phi_2$ applied to the gates of transistors $Q_1$ and $Q_2$. Referring to FIGS. 2 and 3, the read-out operation of program counter 1 will be described in detail. As shown in FIG. 3, clock signals $\phi_1$ and $\phi_2$ are generated alternately. When a pulse signal is applied to address output enable terminal 5, the contents of program counter 1 are transferred through transfer-gate transistors $T_1$ through $T_{12}$ to shift register 4, as described with reference to FIG. 1. In FIG. 2, the least significant bit is transferred from output terminal 1-12 through transistor $T_{12}$ to transistor $Q_3$ and is stored therein. Then, a pulse $P_{11}$ of clock signal $\phi_1$ is applied to the gate of transistor $Q_1$ so that the data stored in transistor $Q_3$ is transferred through transistor $Q_1$ to transistor $Q_5$ and stored therein. The data stored in transistor $Q_5$ is read out from the drain of transistor $Q_5$ to the address output terminal 6. After this, pulse $P_{21}$ of clock signal $\phi_2$ is applied to the gate of transistor $Q_2$ so that data stored in the upper bit stage 4-11 is transferred through transistor $Q_2$ to transistor $Q_3$ and stored therein. Simultaneously, data stored in the upper bit stage 4-10 (not shown in FIG. 2, but shown in FIG. 1) is transferred to stage 4-11. Similar operations are effected regarding the other stages of shift register 4. By applying the clock pulses of clock signals $\phi_1$ and $\phi_2$ sequentially, the data stored in shift register 4 is sequentially output from the least significant bit to the most significant bit.

In the embodiment described above, address output terminal 6 is connected to the least significant bit stage of shift register 4, so that the data is read out from the least significant bit. Alternatively, address output terminal 6 may be connected to the most significant bit stage for reading out data from the most significant bit.

The program counter may alternatively comprise more than 12 bits in accordance with the number of addresses in the ROM to be accessed.

In the above described embodiment, address output enable terminal 5 and address output terminal 6 are physically separated from each other. Alternatively, these terminals 5 and 6 may be realized in one terminal including a switching circuit 7 for selecting the signal line connected to the gates of transistors $T_1$ through $T_{12}$ or the signal line connected to the drain of the transistor $Q_5$.

Still further, instead of using the existing input/output terminals as address output enable terminal 5 and address output terminal 6, these terminals 5 and 6 may, according to the present invention, be newly added to the one-chip microcomputer.

Still further, instead of sequentially outputting the address data from the shift register in response to the clock signals, the address data stored in the shift register may alternatively be output in parallel.

From the foregoing description, it will be apparent that, according to the present invention, in a one-chip microcomputer having a terminal used for more than only outputting the contents of a program counter, the contents of the program counter can be read out in a shorter time in comparison with conventional microcomputers. Also, since the address output enable terminal and the address output terminal are realized by existing input/output terminals, the contents of the program counter can be read out without adding any input/output terminals.

I claim:

1. A circuit operatively connected to receive clock signals and operatively connected to a memory in a one-chip microcomputer, for reading out address data to the outside, comprising:

a program counter having a plurality of outputs for specifying readout addresses of the memory;

a shift register comprising a plurality of stages, each of said stages having an input operatively connected to said program counter and operatively connected to receive the clock signals, and having an output, said plurality of stages comprise the stages of a least significant bit stage to a most signifiant bit stage, each stage being sequentially connected to the next upper bit stage;

a plurality of transfer gates, each respective transfer gate having an input operatively connected to one of said outputs of said program counter, having an ouput, respectively, operatively connected to one of said inputs of said shift register, and having a gate;

an address output enable terminal, operatively connected to said transfer gates, for receiving an address output enable signal, said outputs of said program counter being transferred through said transfer gates to said shift register when said address output enable signal is applied to said address output enable terninal; and an address output terminal, operatively connected to one of said outputs of said shift register, for outputting the contents stored in said shift register.

2. A circuit as set forth in claim 1, wherein each of said transfer gates comprises a metal oxide semiconductor transistor.

3. A circuit as set forth in claim 1, wherein the memory comprises a read-only memory.

4. A circuit as set forth in claim 1, wherein said address output terminal is operatively connected to the output of said least significant bit stage.

5. A circuit as set forth in claim 1, wherein said address output terminal is operatively connected to the output of said most significant bit stage.

6. A circuit as set forth in claim 1, 2 or 3, wherein said address outut terminal is adapted to output in parallel the contents of said shift register.

7. A circuit as set forth in claim 4 or 5, wherein said contents stored in said shift register are output in series from said address output terminal in response to the clock signals applied to said shift register.

* * * * *